US008023926B2

(12) United States Patent
Cai et al.

(10) Patent No.: US 8,023,926 B2
(45) Date of Patent: Sep. 20, 2011

(54) OFFLINE CHARGING FOR SESSIONS OVER A 3GPP NETWORK AND A WLAN ACCESS NETWORK

(75) Inventors: Yigang Cai, Naperville, IL (US); Shiyan Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 803 days.

(21) Appl. No.: 12/032,668

(22) Filed: Feb. 16, 2008

(65) Prior Publication Data

US 2009/0209229 A1    Aug. 20, 2009

(51) Int. Cl.
*H04M 11/00* (2006.01)
(52) U.S. Cl. ........................... 455/406; 455/405
(58) Field of Classification Search .......... 455/405–409, 455/411, 422.1, 435.1; 370/338, 352, 401, 370/908; 705/34, 40, 1, 5, 30; 379/114.01–114.03, 379/114.28–114.29, 115.03, 116, 127.03; 725/1
See application file for complete search history.

(56) References Cited

U.S. PATENT DOCUMENTS

| | | | |
|---|---|---|---|
| 7,221,929 B2 * | 5/2007 | Lee et al. | 455/408 |
| 7,424,102 B2 * | 9/2008 | Koskinen et al. | 379/114.22 |
| 7,610,037 B2 * | 10/2009 | Stura et al. | 455/406 |
| 7,680,481 B2 * | 3/2010 | Ejzak et al. | 455/406 |
| 7,764,947 B2 * | 7/2010 | Koskinen et al. | 455/405 |
| 2004/0167834 A1 * | 8/2004 | Koskinen et al. | 705/30 |
| 2005/0026558 A1 | 2/2005 | Stura et al. | |
| 2006/0285534 A1 * | 12/2006 | Bryson et al. | 370/352 |
| 2007/0130389 A1 * | 6/2007 | Petersson et al. | 710/52 |

OTHER PUBLICATIONS

3GPP TS 32.299 V7.7.0 (Sep. 2007) 3rd Generation Partnership Project; Technical Specification Group Service and System Aspects; Telecommunication management; Charging management; Diameter charging applications (Release 7).*
Digital cellular telecommunications system (Phase 2+); Universal mobile Telecommunications System (UMTS); Telecommunication management; Charging management; Wireless Local Area Network (WLAN) charging (3GPP TS 32.252 version 7.0.0 Release 7); ETSI TS 132 252 Cedex, ETSI Standards, LIS, Sophia Antipolis Cedex, France, vol. 3-SA5, No. V7.0.0, Jun. 2007.
Digital cellular telecommunications system (Phase 2+); Universal Mobile Telecommunication management; charging management, Packet Switched (PS) domain charging (3GPP TS 32.251 version 7.5.1 Release 7); ETSI TS 132 251 version 7.5.1 Release 7); ETSI TS 132 Sophia Antipolis Cedex, France, vol. 3-SA5; 3-CT5, No. V7.5.1, Oct. 2007.

(Continued)

*Primary Examiner* — Anthony Addy
(74) *Attorney, Agent, or Firm* — Duft, Bornsen & Fishman, LLP

(57) ABSTRACT

Communication networks and methods are disclosed for providing offline charging in a 3GPP network for sessions over a wireless local area network (WLAN) access network. A AAA server in the 3GPP network provides offline charging messages for a session to an offline charging system. If a data flow is established during the session, such as streaming video, then a packet data network gateway provides offline charging messages for the data flow to the offline charging system. The AAA server and the packet data network gateway share charging identifiers so that one or both are able to include the charging identifier for the session and the charging identifier for the data flow in an offline charging message. This allows the offline charging system to effectively correlate CDRs for the session with CDRs for the data flow occurring during the session.

20 Claims, 6 Drawing Sheets

OTHER PUBLICATIONS

Digital Cellular telecommunications system (Phase 2+); Universal Mobile Telecommunications System (UTMS); Telecommunications management; Charging management; Charging architecture and principles (3GPP TS 32.240 version 7.2.0 Release 7);ETSI TS 132 240, ETSI Standards, LIS, Sophia Antipolis Cedex, France, vol. 3-SA5, No. V7.2.0, Mar. 2007.

SA5 (Telecom Management) "IMS Bearer Service Charging" 3GPP Draft; S5-071778, 3rd Generation Partnership Project (3GPP), Mobile Competence Centre; 650, Route Des Lucioles; F-06921 Sophia-Antipolis Cedex; France vol. SA WG5, no. Guangzhou, China; 20071022, Oct. 2007 XP050306368.

Alcatel-Lucent: WLAN Offline Charging: 3GPP Draft; S5-072016, 3rd Generation Partnership Project (3GPP), Mobile Competence Centre; 650, Route Des Lucioles; F-06921 Sophia-Antipolis Cedex; France vol. SA WG5, no. Guangzhou, China; 20071022, Oct. 2005 XP050306527.

Alcatel-Lucent: "IMS Bearer Service Charging" 3GPP Draft; S5-071734, 3rd Generation Partnership Project (3GPP), Mobile Competence Centre; 650, Route Des Lucioles; F-06921 Sophia-Antipolis Cedex; France vol. SA WG5, no. Guangzhou, China; 20071022, Oct. 2005 XP050306340.

\* cited by examiner

OFFLINE CHARGING FOR SESSIONS OVER A 3GPP NETWORK AND A WLAN ACCESS NETWORK

BACKGROUND OF THE INVENTION

1. Field of the Invention

The invention is related to the field of communication networks and, in particular, to providing for offline charging in 3GPP networks for sessions over a wireless local area network (WLAN) access network.

2. Statement of the Problem

The 3rd Generation Partnership Project (3GPP) is a collaboration between groups of telecommunications associations to make a globally applicable third generation (3G) mobile phone system specification. The 3GPP specifications are based on Global System for Mobile Communications (GSM) specifications. The 3rd Generation Partnership Project 2 (3GPP2) specifies standards for another 3G technology based on IS-95 (CDMA), commonly known as CDMA2000.

A core network, as specified by the 3GPP and 3GPP2, may be connected to a variety of access networks. One type of access network is a wireless local area network (WLAN). A WLAN is the linking of two or more computers or devices over an air interface. WLAN utilizes radio waves to enable communication between devices in a limited area through technologies such as Wi-Fi or WiMAX. A WLAN gives users the mobility to move around within a broad coverage area and still be connected to the 3GPP (core) network.

When the communication device of a user is connected to the WLAN, the user may be able to initiate a session over the 3GPP network. For example, the user may place a call to another person over the core network. The user may also download a movie or video stream over the core network (assuming the communication device is properly equipped). One problem encountered when a session is connected over a 3GPP network and a WLAN access network is charging for the session. The 3GPP has published a technical specification describing charging management over a WLAN in 3GPP TS 32.252 (Release 7). Unfortunately, this technical specification does not adequately define how sessions are charged over a 3GPP network and a WLAN access network.

A session is typically charged based on a duration for the session and a particular rating applied to the session. To provide this type of charging, an Authentication, Authorization, and Accounting (AAA) server, which manages the session in the 3GPP network, has a charging trigger function (CTF) that identifies charging events during a session. Through the CTF, the AAA server identifies the start of a session, and transmits an accounting request message (start) to an offline charging system. The AAA server may also transmit one or more interim accounting request messages to the offline charging system. At the end of the session, the AAA server transmits an accounting request message (stop) to the offline charging system. The accounting request messages (start and stop) define the duration of the session.

The offline charging system then generates one or more Charging Data Records (CDR) for the session that includes information indicating the duration for the session, and transmits the CDR(s) to a billing domain. The billing domain may then determine a charge for the session based on the rating and the duration.

Charging for the session based on duration may not be the most effective method for charging. During a session, the user of the communication device may download a video clip or perform some other data communication (as opposed to a voice communication). A data communication performed during a session is referred to herein as a data flow. A data flow is a bearer-level segment of data that is transmitted or received by a communication device during a session over the 3GPP network and the WLAN access network. It will be advantageous to charge for data flows during a session with more criteria/options, instead of merely charging for the duration of the session. For instance, a network operator may want to charge for data flows based on the volume of the data flow, the media type for the data flow, etc. Unfortunately, the 3GPP specifications do not adequately define how charging for data flows is performed within the 3GPP network.

SUMMARY OF THE SOLUTION

Embodiments of the invention solve the above and other related problems with an effective way of charging for data flows in addition to sessions in 3GPP networks. Data flows in the 3GPP network are handled through a packet data network gateway, which interfaces the WLAN access network with a packet network, such as the internet. To provide offline charging as provided herein, the packet data network gateway transmits accounting request messages for the data flows to the offline charging system in addition to the AAA server transmitting accounting request messages for the session to the offline charging system. These network elements may transmit the accounting request messages over an enhanced Diameter Rf interface as is further described herein. One or both of the AAA server and the packet data network gateway insert a charging identifier for the session and a charging identifier for the data flow in an accounting request message. The offline charging system may then correlate a CDR for the session with a CDR for a data flow during the session to generate a consolidated CDR which is transmitted to a billing domain. The consolidated CDR includes charging information for both the session and the data flow occurring during the session. Thus, a network operator may charge a user directly for the data flow, instead of only charging the user for the duration of the session. This gives the network operator more flexibility in charging, which was not previously allowed.

In one embodiment, a communication network includes a wireless local area network (WLAN) adapted to provide wireless communication service to a communication device, and a 3GPP network having an Authentication, Authorization, and Accounting (AAA) server operable to manage a session involving the communication device. When a session is established, the AAA server is operable to identify a session charging identifier assigned to the session, and to transmit one or more accounting request messages for the session to an offline charging system. The communication network further includes a packet data network gateway operable to manage a data flow during the session. When the data flow is established, the packet data network gateway is operable to identify a data flow charging identifier assigned to the data flow, and to transmit one or more accounting request messages for the data flow to the offline charging system.

At some point during the session, the AAA server and the packet data network gateway are further operable to share the session charging identifier or the data flow charging identifier with the other. For example, the AAA server may transmit an update message to the packet data network gateway in order to share the session charging identifier with the packet data network gateway. The packet data network gateway may transmit an update message to the AAA server in order to share the data flow charging identifier with the AAA server. When the charging identifiers are shared between the AAA server and the packet data network gateway, an accounting request message from one or both of the AAA server and the packet data network gateway includes the session charging identifier and the data flow charging identifier.

The communication network also includes the offline charging system. A Charging Data Function (CDF) in the offline charging system is operable to process the accounting request messages for the session from the AAA server to generate a charging data record (CDR) for the session. The CDF is further operable to process the accounting request messages for the data flow from the packet data network gateway to generate a CDR for the data flow. Because one or more of these accounting request messages includes both the session charging identifier and the data flow charging identifier, the CDF inserts both the session charging identifier and the data flow charging identifier in one or more of the generate CDRs.

A Charging Gateway Function (CGF) in the offline charging system is operable to process the session charging identifier and the data flow charging identifier in a CDR to identify other CDRs having one of the session charging identifier and the data flow charging identifier. The CGF is further operable to correlate the CDRs based on the session charging identifier and the data flow charging identifier to generate a consolidated CDR, and transmit the consolidated CDR to a billing domain.

The invention may include other exemplary embodiments described below.

DESCRIPTION OF THE DRAWINGS

The same reference number represents the same element or same type of element on all drawings.

DESCRIPTION OF THE INVENTION

Figure 1:
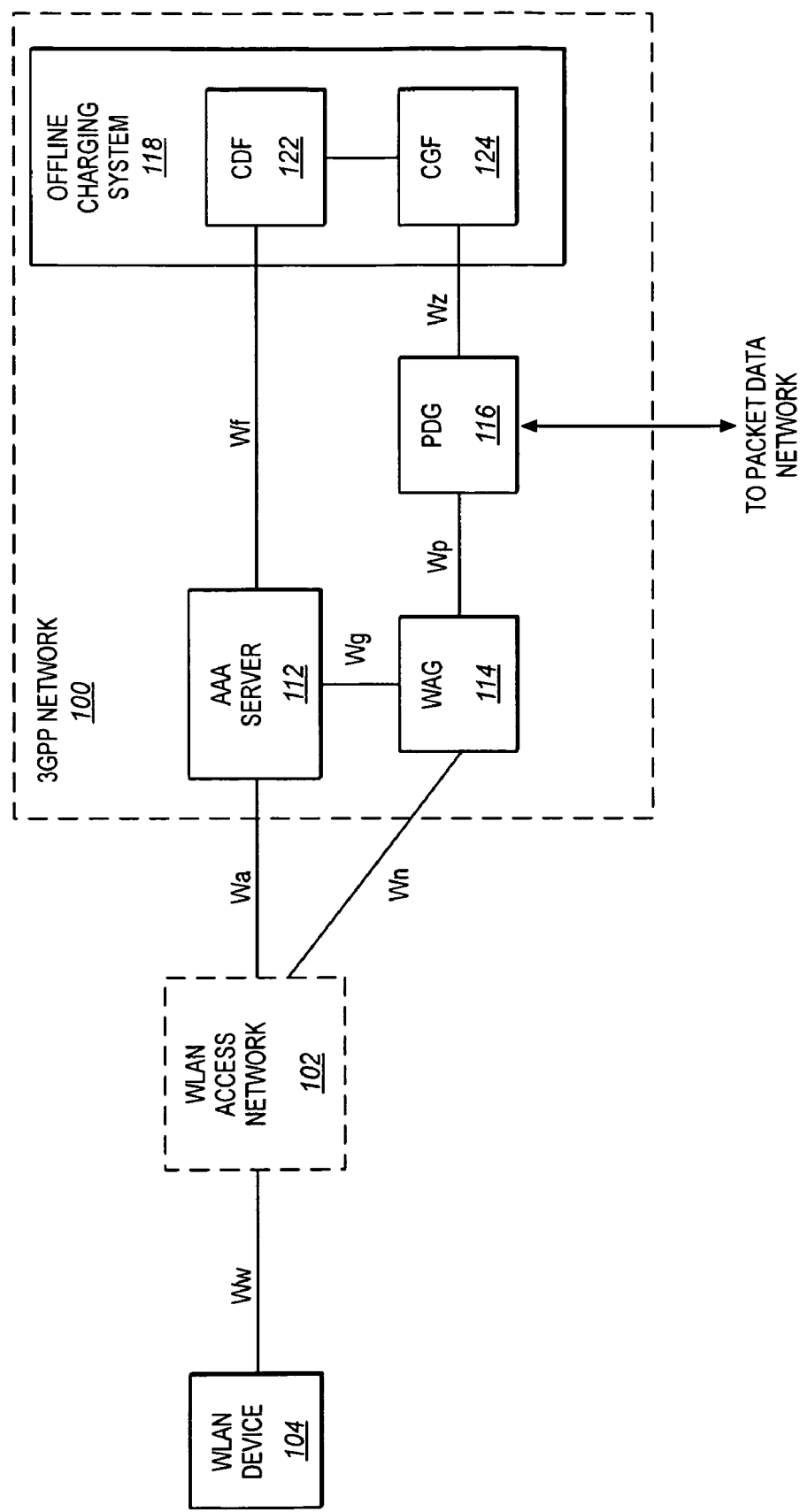
FIG. 1 illustrates a 3GPP network in the prior art.

FIG. 1 illustrates a 3GPP network 100 in the prior art. 3GPP network 100 is connected to a WLAN access network 102 to provide a communication service to a WLAN communication device 104 (also referred to as WLAN user equipment (UE)). 3GPP network 100 includes an Authentication, Authorization, and Accounting (AAA) server 112, a WLAN access gateway (WAG) 114, a packet data gateway (PDG) 116, and an offline charging system 118. Offline charging system 118 includes a Charging Data Function (CDF) 122 and a Charging Gateway Function (CGF) 124. Those skilled in the art will appreciate that 3GPP network 100 may include other network nodes, such as a AAA proxy, an online charging system, a Home Subscriber Server (HSS), etc, which are further defined in the 3GPP TS 32.252 technical specification.

AAA server 112 is operable to control access to network resources in 3GPP network 100 and to manage sessions over the network. AAA server 112 includes a CTF that identifies charging events during sessions, and transmits accounting request messages to CDF 122 over a Diameter Wf reference point. WAG 114 is a gateway through which data to/from WLAN access network 102 is routed via the PLMN to provide communication device 104 access to 3G packet-switched services. PDG 116 is another gateway through which 3G packet-based services are accessed in the user's home network. PDG 116 interfaces with CGF 124 over a Wz reference point.

Assume that a user of communication device 104 initiates a session over WLAN access network 102 and 3GPP network 100. AAA server 112 manages the session (i.e., a SIP session) in 3GPP network by exchanging the appropriate signaling with device 104. The following illustrates charging for the session in 3GPP network 100.

Figure 2:
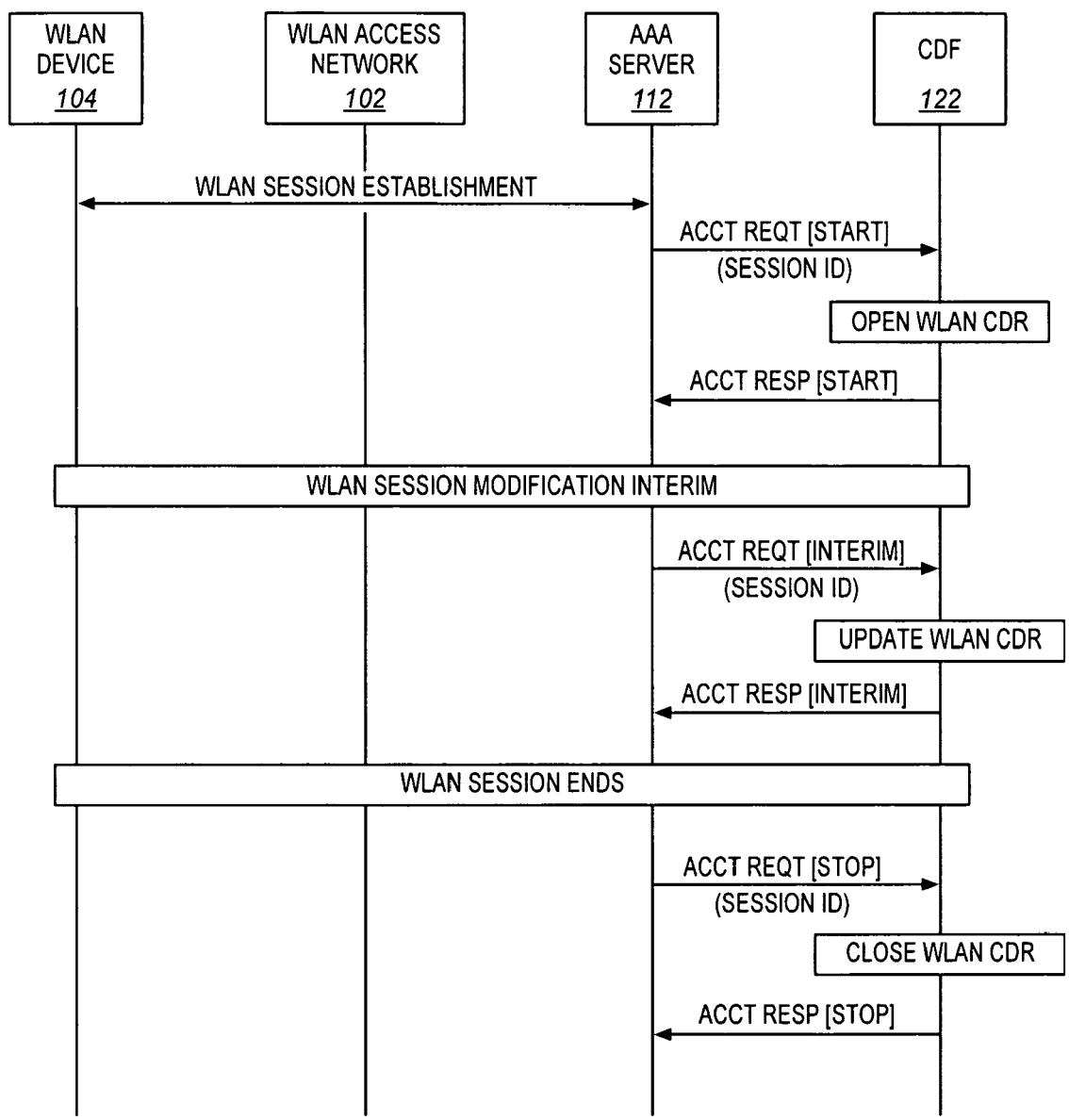
FIG. 2 is a message diagram illustrating charging for a session in the prior art.

FIG. 2 is a message diagram illustrating charging for a session in the prior art. Through the CTF, AAA server 112 identifies the start of the WLAN session, and generates an accounting request [start] message. AAA server 112, or another network node handling the session, assigns a unique session charging identifier (ID) to the session. AAA server 112 inserts the session charging ID in the accounting request [start] message, and transmits the accounting request [start] message to CDF 122 over the Wf reference point. Responsive to receiving the accounting request [start] message, CDF 122 opens a CDR for the session, and transmits an accounting response [start] message to AAA server 112.

During the session, if the CTF identifies another charging event (such as a modification to the session), then AAA server 112 transmits an accounting request [interim] message to CDF 122 over the Wf reference point. Again, AAA server 112 inserts the session charging ID in the accounting request [interim] message. Responsive to the accounting request [interim] message, CDF 122 updates the CDR for the session, and transmits an accounting response [interim] message to AAA server 112.

At some point AAA server 112 identifies the end of the session, and transmits an accounting request [stop] message to CDF 122 over the Wf reference point. Responsive to the accounting request [stop] message, CDF 122 closes the CDR for the WLAN session. The CDR includes charging information for the session, along with the session charging ID and possibly other identifiers, such as a WLAN access network ID. CDF 122 then transmits an accounting response [stop] message to AAA server 112.

In FIG. 1, after closing the CDR, CDF 122 transmits the CDR (possibly along with other CDRs) to CGF 124. CGF 124 correlates the CDR with other CDRs for the session using the session charging ID and/or other identifiers to generate a consolidated CDR. CGF 124 then transmits the consolidated CDR to a billing domain (not shown) where the user is charged for the session.

If a bearer-level data flow is initiated during the session, PDG 116 is adapted to collect charging data for the data flow. At the start of the data flow, PDG 116 opens a CDR for the data flow, and also assigns a unique data flow charging identifier (ID). PDG 116 then monitors or counts the volume of the data flow. When the data flow ends, PDG 116 stops counting the volume of the data flow and closes the CDR for the data flow. The CDR for the data flow includes the volume of the data flow, and the data flow charging ID. PDG 116 then transmits the CDR to CGF 124 over the Wz reference point.

Even though CGF 124 has one or more CDRs for the session and one or more CDRs for data flows occurring during the session, CGF 124 presently does not have an effective way to correlate the CDRs. The CDR for the session and the CDR for the data flow may be difficult to correlate because they have different charging IDs. The CDR for the session has a unique session charging ID that is assigned to the session by AAA server 112 (or another network element). The CDR for the data flow has a unique charging ID that is assigned to the data flow by PDG 116. Because these charging IDs are different, CGF 124 is not able to correlate the CDRs.

The CDRs for data flows and the CDRs for the session may be correlated in the billing domain based on other information, such as an identifier for communication device 104. However, correlating CDRs in the billing domain is presently inefficient. The CDR for the session and the CDR for the data flow may not be received in the billing domain at substantially the same time. Thus, it is common for a billing domain to wait an extended period of time before attempting to correlate CDRs so that it is assured that all CDRs have been received. For instance, the billing domain may wait until the end of the month to perform a CDR correlation. Thus, it would be desirable to provide an improved way of charging for sessions and data flows over a 3GPP network and a WLAN access network.

FIGS. 3-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
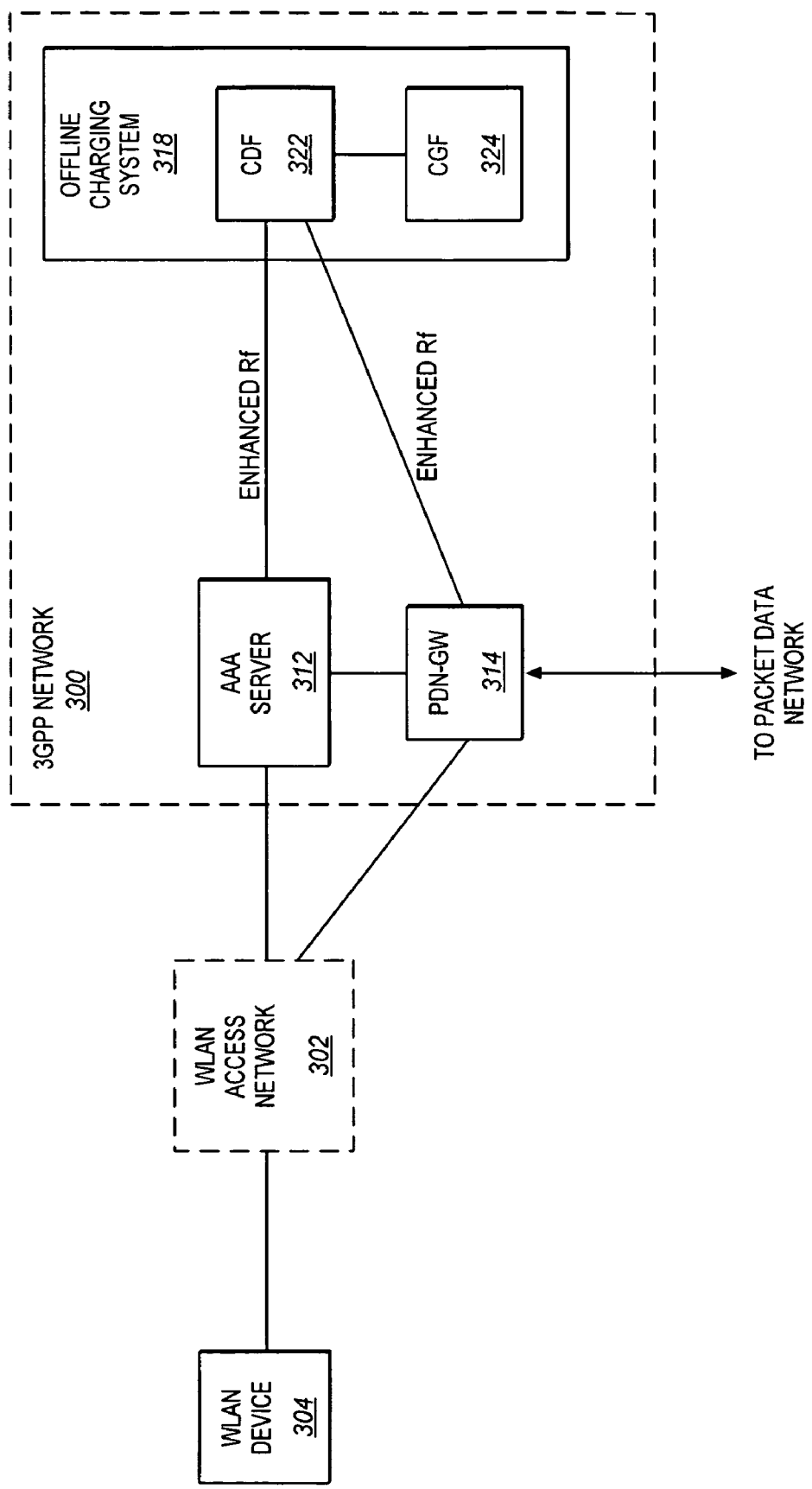
FIG. 3 illustrates a 3GPP network in an exemplary embodiment of the invention.

FIG. 3 illustrates a 3GPP network 300 in an exemplary embodiment of the invention. 3GPP network 300 is connected to a WLAN access network 302 to provide a communication service to a WLAN communication device 304 in a non-roaming scenario. WLAN access network 302 comprises any type of network that provides wireless IP or packet-based connectivity to communication device 304, such as a Wi-Fi network or a WiMAX network. 3GPP network 300 includes a AAA server 312, a packet data network gateway (PDN-GW) 314, and an offline charging system 318. AAA server 312 may also represent a AAA proxy when communication device 304 is roaming. Packet data network gateway 314 comprises any system or server operable to provide communication device 304 access to 3GPP packet switched services over a packet data network, such as the internet, an intranet, etc. If communication device 304 downloads a video file as a data flow over the packet data network, for instance, then the bearer data for the data flow is accessed through packet data network gateway 314. One example of packet data network gateway 314 is a PDG as described in the 3GPP technical specifications. Those skilled in the art will appreciate that 3GPP network 300 may include other network nodes, such as a WLAN access gateway (WAG), an online charging system, a Home Subscriber Server (HSS), etc, which are further defined in the 3GPP TS 32.252 technical specification.

Packet data network gateway 314 is illustrated as part of 3GPP network 300 in this embodiment. In other embodiments, packet data network gateway 314 may be implemented outside of 3GPP network 300. Packet data network gateway 314 may be a non-3GPP network element and reside in a non-3GPP network, such as CDMA2000. However, packet data network gateway 314 still interfaces with AAA server 312 to exchange charging identifiers, and still sends enhanced Diameter Rf to CDF 322 in the 3GPP network 300.

Offline charging system 318 comprises any system or set of functions that provide offline charging in 3GPP network 300. In this embodiment, offline charging system 318 includes a Charging Data Function (CDF) 322 and a Charging Gateway Function (CGF) 324. In other embodiments, offline charging system 318 may comprise other types of charging functions, such as a Charging Collector Function (CCF).

In this embodiment of 3GPP network 300, AAA server 312 is connected to CDF 322 through a Diameter Rf interface. Additionally, packet data network gateway 314 is also connected to CDF 322 through a Diameter Rf interface. The Diameter Rf interface as described herein is enhanced over the common Rf interface, meaning that new Attribute Value Pairs (AVPs) are defined herein for the Diameter messages to include additional information. Thus, the enhanced Diameter Rf interface for packet data network gateway 314 carries WLAN data flow AVPs, such as volume, bandwidth, protocols, etc. Although Diameter Rf is used in this embodiment, those skilled in the art will appreciate that other interfaces may be used that have similar AVPs.

Assume that a user of communication device 304 initiates a session over WLAN access network 302 and 3GPP network 300. AAA server 312 manages the session (i.e., a SIP session) in 3GPP network 300 by exchanging the appropriate signaling with device 304. AAA server 312 also provides charging for the session, as is described in FIG. 4. Further assume that the user of communication device 304 either uploads packet-based data or downloads packet-based data through packet data network gateway 314 during the session. The upload/download of packet-based data is referred to herein as a data flow or a bearer-level data flow. Packet data network gateway 314 manages the data flow and provides charging for the data flow, as is described in FIG. 4.

Figure 4:
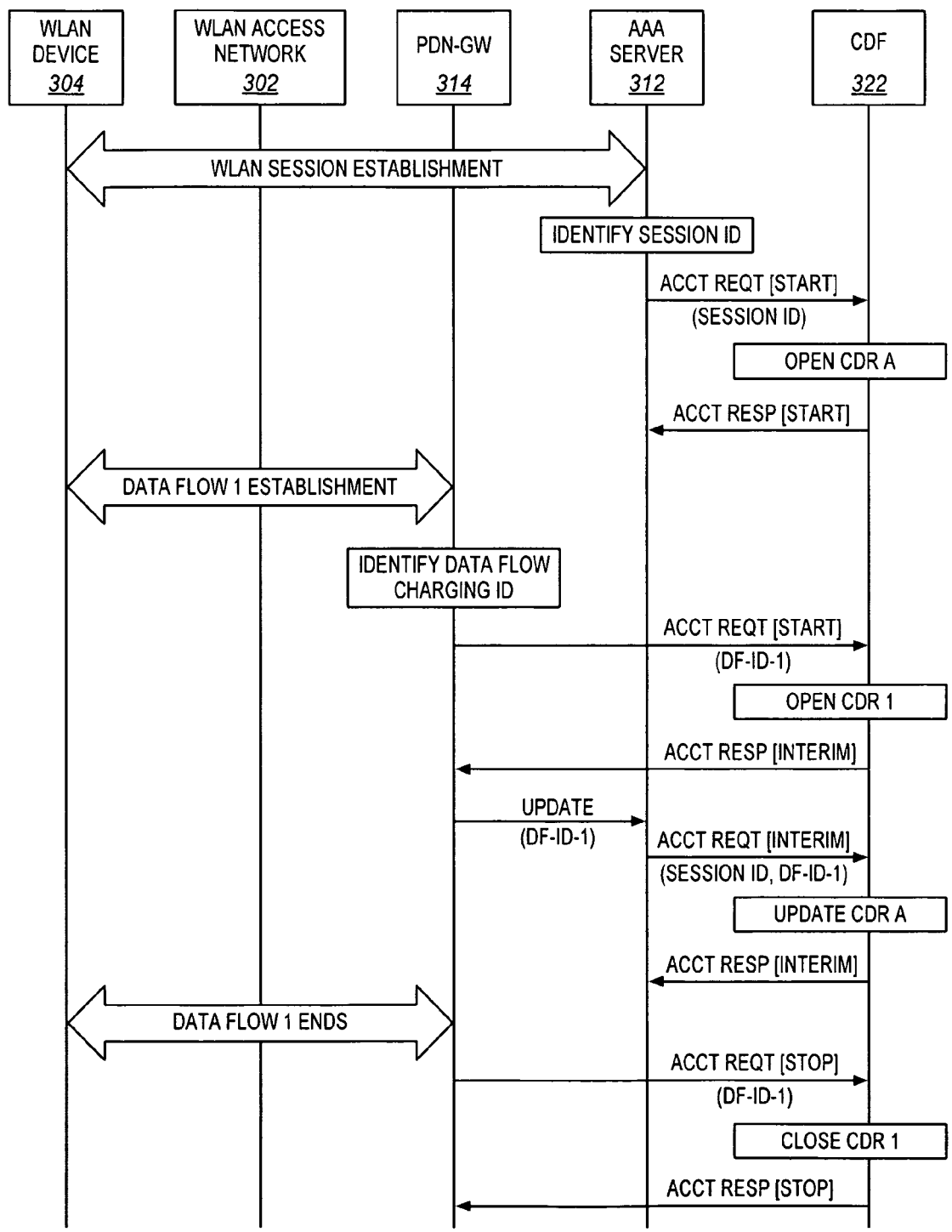
FIGS. 4-5 are message diagrams illustrating charging in a 3GPP network for a session and data flows in an exemplary embodiment of the invention.
Figure 5:
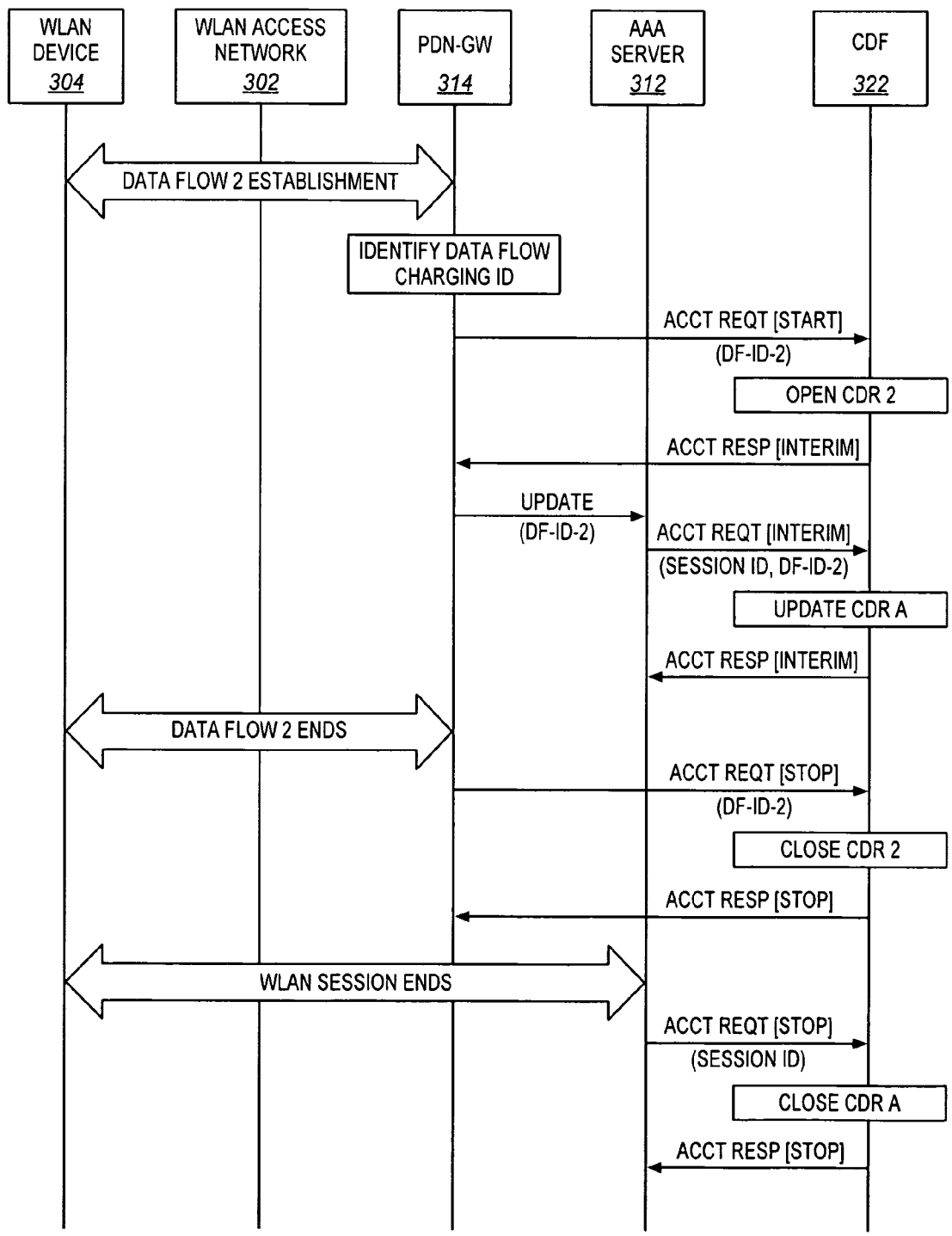

FIGS. 4-5 are message diagrams illustrating charging in 3GPP network 300 for the session and the data flow in an exemplary embodiment of the invention. When the session is established, a unique session charging identifier (ID) is assigned to the session. AAA server 312 may assign the session charging ID or it may be assigned by another network element. There may also be other identifiers associated with the session, such as an identifier for communication device 304, an identifier for WLAN access network 302, etc.

In response to the start of the session, AAA server 312 identifies the session charging ID, and generates an accounting request [start] message (which is an offline charging message) indicating the start of the session. The accounting request [start] message may comprise a Diameter Accounting Request (ACR) [start] message. AAA server 312 inserts the session charging ID in the accounting request [start] message, along with other charging information, and transmits the accounting request [start] message to CDF 322. Responsive to receiving the accounting request [start] message from AAA server 312, CDF 322 opens a Charging Data Record (CDR) for the session (indicated as CDR A). CDF 322 also responds to AAA server 312 with an accounting response [start] message.

Further assume that a first data flow is initiated during the session, which is handled through packet data network gateway 314. When the first data flow is established, a unique data flow charging identifier (ID) is assigned to the first data flow, which is indicated in FIG. 4 as DF-ID-1. Packet data network gateway 314 may assign the data flow charging ID or it may be assigned by another network element. In response to the start of the first data flow, packet data network gateway 314 identifies the data flow charging ID, and generates an accounting request [start] message indicating the start of the first data flow. The accounting request [start] message may comprise a Diameter ACR [start] message. Packet data network gateway 314 inserts the data flow charging ID in the accounting request [start] message, along with other charging information, and transmits the accounting request [start] message to CDF 322. Responsive to receiving the accounting request [start] message from packet data network gateway 314, CDF 322 opens a CDR for the first data flow (indicated as CDR 1). CDF 322 also responds to packet data network gateway 314 with an accounting response [start] message.

At some point, AAA server 312 and packet data network gateway 314 share or exchange the session charging ID and the data flow charging ID with one another. For instance, packet data network gateway 314 may transmit an update message to AAA server 312 indicating the data flow charging ID assigned to the first data flow. In addition or in the alternative, AAA server 312 may transmit an update message to packet data network gateway 314 indicating the session charging ID assigned to the session. After sharing the charging IDs, one or both of AAA server 312 and packet data network gateway 314 inserts both the session charging ID and the data flow charging ID in an accounting request message.

In the embodiment illustrated in FIG. 4, packet data network gateway 314 transmits an update message to AAA server 312 indicating the data flow charging ID (DF-ID-1) assigned to the first data flow. Responsive to receiving the update message, AAA server 312 generates an accounting request [interim] message, such as a Diameter ACR [interim] message, and inserts both the session charging ID (session ID) and the data flow charging ID (DF-ID-1) in the accounting request [interim] message. AAA server 312 then transmits the accounting request [interim] message to CDF 322. CDF 322 then updates the CDR for the session with the data flow charging ID (DF-ID-1) for the first data flow. CDF 322 also responds to AAA server 312 with an accounting response [interim] message.

When the first data flow ends, packet data network gateway 314 generates an accounting request [stop] message indicating the end of the data flow, such as a Diameter ACR [stop] message. Packet data network gateway 314 then transmits the accounting request [stop] message to CDF 322. Responsive to receiving the accounting request [stop] message from packet data network gateway 314, CDF 322 closes a CDR for the first data flow. CDF 322 also responds to packet data network gateway 314 with an accounting response [stop] message.

In FIG. 5, if a second data flow is established during the session, another unique data flow charging ID is assigned to the second data flow, which is indicated in FIG. 5 as DF-ID-2. In response to the start of the second data flow, packet data network gateway 314 identifies the data flow charging ID, and generates an accounting request [start] message indicating the start of the second data flow. The accounting request [start] message may comprise a Diameter ACR [start] message. Packet data network gateway 314 inserts the data flow charging ID in the accounting request [start] message, along with other charging information, and transmits the accounting request [start] message to CDF 322. Responsive to receiving the accounting request [start] message from packet data network gateway 314, CDF 322 opens a CDR for the second data flow (indicated as CDR 2). CDF 322 also responds to packet data network gateway 314 with an accounting response [start] message.

Again, AAA server 312 and packet data network gateway 314 share the session charging ID and the data flow charging ID with one another. In the embodiment illustrated in FIG. 5, packet data network gateway 314 transmits an update message to AAA server 312 indicating the data flow charging ID (DF-ID-2) assigned to the second data flow. Responsive to receiving the update message, AAA server 312 generates an accounting request [interim] message, such as a Diameter ACR [interim] message, and inserts both the session charging ID (session ID) and the data flow charging ID (DF-ID-2) in the accounting request [interim] message. AAA server 312 then transmits the accounting request [interim] message to CDF 322. CDF 322 then updates the CDR for the session with the data flow charging ID (DF-ID-2) for the second data flow. Thus, the CDR for the session includes the charging ID for the first data flow and the charging ID for the second data flow. CDF 322 also responds to AAA server 312 with an accounting response [interim] message.

When the second data flow ends, packet data network gateway 314 generates an accounting request [stop] message indicating the end of the data flow, such as a Diameter ACR [stop] message. Packet data network gateway 314 then transmits the accounting request [stop] message to CDF 322. Responsive to receiving the accounting request [stop] message from packet data network gateway 314, CDF 322 closes a CDR for the second data flow. CDF 322 also responds to packet data network gateway 314 with an accounting response [stop] message.

When the session ends, AAA server 312 identifies the end of the session, and transmits an accounting request [stop] message to CDF 322. Responsive to the accounting request [stop] message, CDF 322 closes the CDR for the session. The CDR includes charging information for the session, along with the session charging ID, the data flow charging ID for the first data flow, and the data flow charging ID for the second data flow. CDF 322 also responds to AAA server 312 with an accounting response [stop] message.

CDF 322 has generated a CDR for the session (CDR A), a CDR for the first data flow (CDR 1), and a CDR for the second data flow (CDR 2). CDF 322 then transmits these CDRs to CGF 324. CGF 324 operates to correlate the CDR for the session with the CDRs for the data flows occurring during the session. Those skilled in the art will appreciate that CGF 324 may receive CDRs for the session from multiple CDFs even though only one CDF is illustrated in FIG. 3.

Figure 6:
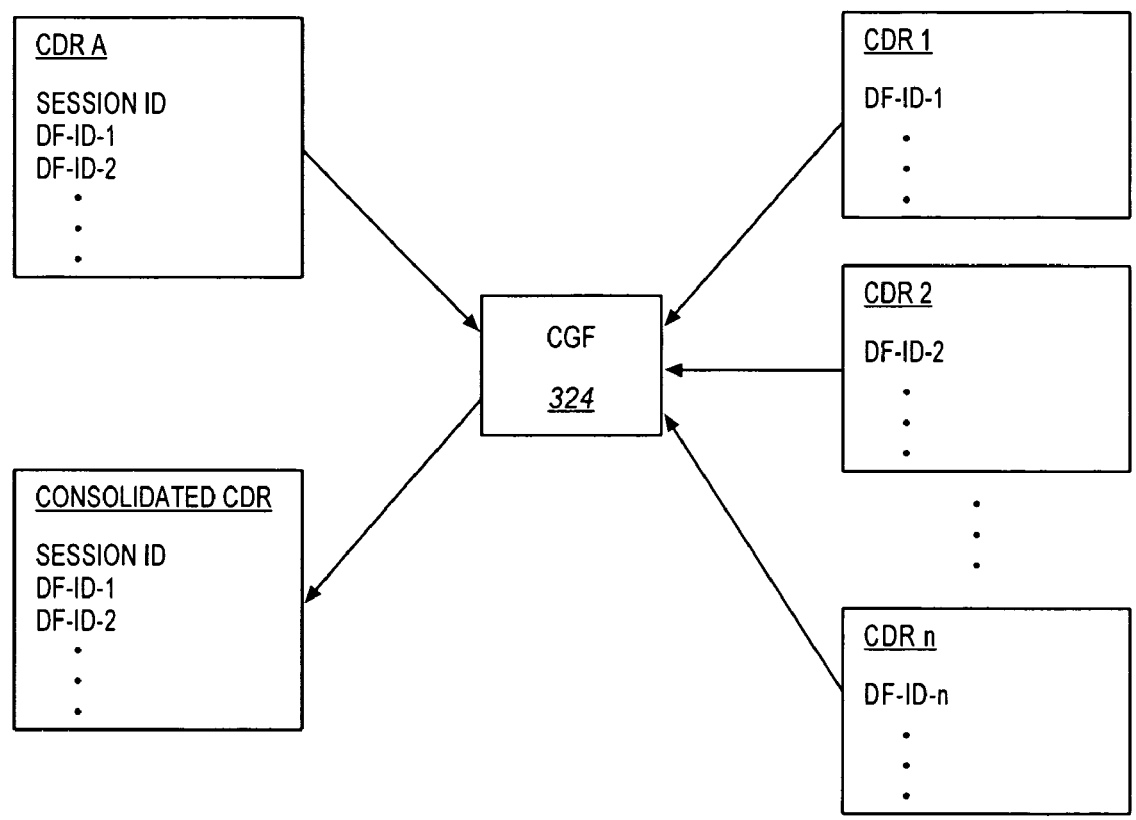
FIG. 6 illustrates a CGF correlating CDRs in an exemplary embodiment of the invention.

FIG. 6 illustrates CGF 324 correlating CDRs in an exemplary embodiment of the invention. CGF 324 receives a CDR for the session (CDR A) that includes the session charging ID, the data flow charging ID (DF-ID-1) for the first data flow, and the data flow charging ID (DF-ID-2) for the second data flow. CGF 324 receives a CDR (CDR 1) for the first data flow that includes the data flow charging ID (DF-ID-1) for the first data flow. CGF 324 also receives a CDR (CDR 2) for the second data flow that includes the data flow charging ID (DF-ID-2) for the second data flow. CGF 324 may also receive other CDRs for the session and other CDRs for other data flows occurring during the session.

CGF 324 then processes the session charging ID and the data flow charging ID that are included in the CDR for the session to identify other CDRs having the session charging ID and/or one of the data flow charging IDs. In this embodiment, CGF 324 will identify that CDR 1 includes the data flow charging ID (DF-ID-1) for the first data flow, so CGF 324 correlates CDR 1 with the CDR for the session. Likewise, CGF 324 will identify that CDR 2 includes the data flow charging ID (DF-ID-2) for the second data flow, so CGF 324 correlates CDR 2 with the CDR for the session. CGF 324 then correlates these CDRs to generate a consolidated CDR, and transmits the consolidated CDR to a billing domain.

Although the session charging ID and the data flow charging IDs where included in the CDR for the session in this embodiment, those skilled in the art will appreciate that any of the CDRs for the session or for the data flows may include both the session charging ID and the data flow charging IDs. Because AAA server 312 and packet data network gateway 314 may share the charging IDs in any desired manner, any of the CDRs may include both the session charging ID and the data flow charging IDs.

The above embodiments illustrate charging for a non-roaming scenario. In a roaming scenario, there will be a visited network providing session control through a AAA proxy, and a home network providing session control through a AAA server as is known in the art. There will also be a home packet network data gateway and a visited packet network gateway. CDR correlation as described above is performed in a similar manner in a roaming scenario to correlate a AAA Proxy CDR, a AAA Server CDR, and multiple home/visited packet network data gateway CDRs.

As previously mentioned, AAA server 312 and/or packet data network gateway 314 may use an enhanced Diameter Rf interface towards CDF 322. Besides using existing 3GPP offline charging AVPs for WLAN session charging, AAA server 312 may use additional service charging AVPs in the accounting request messages, such as an AVP assigned to the session charging ID, and an AVP assigned to the data flow charging ID. In one specific embodiment, the accounting request messages used by AAA server 312 may include the following AVPs:

Session Charging ID
Data-Flow-Session-ID
WLAN Access Network (AN) address (IP address)
WLAN UE (WLAN device) information
AAA Node address (i.e., IP address of AAA server)
WLAN home agent address (PDN-GW or WAG IP address)
WLAN visited agent address (PDN-GW or WAG IP address)
WLAN home agent session ID
WLAN visited agent session ID
Access Network Charging ID (ANCID)
Access Network Charging Physical Access ID
Access Network Charging Physical Access realm
Accounting-Session-Time There may be other AVPs used that are already defined by the 3GPP, such as Originator Node-ID, Originator Domain, Port Type, Port ID, Operator Name, Operation Type, Operation Number, Operation Token, WLAN service information, Service Context ID, etc.

In a similar manner, besides using existing 3GPP offline charging AVPs for WLAN session charging, packet data network gateway 314 may use additional service charging AVPs in the accounting request messages, such as an AVP assigned to the session charging ID, and an AVP assigned to the data flow charging ID. In one specific embodiment, the accounting request messages used by packet data network gateway 314 may include the following AVPs:

Session ID
Data-Flow-Session-ID
Data-Flow-Session-Start-Time
Data-Flow-Session-Stop-Time
WLAN Access Network (AN) address (IP address)
WLAN UE (WLAN device) information
WLAN home agent address (PDN-GW or WAG IP address)
WLAN visited agent address (PDN-GW or WAG IP address)
WLAN home agent session ID
WLAN visited agent session ID
Access Network Charging ID (ANCID)
Access Network Charging Physical Access ID
Access Network Charging Physical Access realm
Accounting-Input-Octets
Accounting-Output-Octets
Accounting-Input-Packets
Accounting-Output-Packets
Charging-Rule-Name
Charging-Rule-Base-Name
Flow-Description
Data-Flow-Cause-Code
PDN-GW-Type (home or visited)
Transport-Protocol The following is a brief description of some of the newly-defined service charging AVPs for WLAN offline charging (if an AVP code is present, it is re-used for WLAN from existing IETF or other standards). The Accounting-Input-Octets AVP (AVP code 363) is of type Unsigned64 and defines the number of octets in IP packets received from the user (upstream). The Accounting-Input-Packets AVP (AVP code 365) is of type Unsigned64 and defines the number of packets received from the user (upstream). The Accounting-Output-Octets AVP (AVP code 364) is of type Unsigned64 and defines the number of octets in IP packets sent to the user (downstream). The Accounting-Output-Packets AVP (AVP code 366) is of type Unsigned64 and defines the number of packets sent to the user (downstream). The Acct-Session-Time AVP (AVP code 46) is of type Unsigned32 and indicates the length of the current session in seconds. This AVP is included in all accounting request messages and may be present in the corresponding accounting response messages. The WLAN-Service-Cause-Code AVP is of type Integer32 and defines the cause code value from the packet data network gateway 314 associated with particular mobile IP transactions. This AVP is used in accounting request [stop] messages. The WLAN-Agent-Address AVP is of type IPAddress and defines the IP address of the packet data network gateway 314 (or WAG) in the data flow. The Data-Flow-Service-start-Time AVP is of type Time and defines a timestamp (in UTC format) which represents the start of a user session or data flow at the bearer-service manager. The Data-Flow-Service-stop-Time AVP is of type Time and defines a timestamp (in UTC format) which represents the stop of a user session or data flow at the bearer-service manager. The Charging-Rule-Name AVP (AVP code 1005) is of type UTF8String and defines a name for charging rule active in the bearer gateway. The Flow-Description AVP (AVP code 507) is of type IPFilterRule and defines a packet filter for an IP flow. The Home-Agent-Session-ID is of type UTF8String and defines a unique home session identifier for home session accounting record in tracking of session between the WLAN device 304 and home bearer service manager or gateway. The Transport-Protocol AVP is of type Enumerated and defines the transport protocol of the data flow. The Visited-Agent-Session-ID is of type UTF8String and defines the visited session identifier for visited session accounting record in tracking of session between the WLAN device 304 and visited bearer service manager.

Those skilled in the art will appreciate that the AVPs described above represent just one embodiment, and any subset of those AVPs may be used to provide the desired information to CDF 322. The goal of the new AVPs is to allow either AAA server 312 or packet data network gateway 314 to provide a session charging ID and a data flow ID to the CDF 322. This allows for more effective correlation of data flow CDRs with session CDRs.

Because data flows may be charged according to the embodiments provided above, network operators have more flexibility in how WLAN sessions may be charged. For instance, network operators may charge for size of downloads, such as games, video clips, songs, etc. Network operators may charge for the duration of streaming video. Network operators may charge consistently for email and MMS messages based on size, number, etc.

Although specific embodiments were described herein, the scope of the invention is not limited to those specific embodiments. The scope of the invention is defined by the following claims and any equivalents thereof.

We claim:

1. A communication network, comprising:
a wireless local area network (WLAN) operable to provide wireless communication service to a communication device;
a 3rd Generation Partnership Project (3GPP) network connected to the WLAN and having an Authentication, Authorization, and Accounting (AAA) server operable to manage a session involving the communication device, and to identify a session charging identifier assigned to the session; and
a packet data network gateway operable to manage a data flow during the session, and to identify a data flow charging identifier assigned to the data flow;
at least one of the AAA server and the packet data network gateway is further operable to share the session charging identifier or the data flow charging identifier with the other;
the AAA server and the packet data network gateway are each further operable to transmit accounting request messages to an offline charging system;
wherein after sharing the charging identifiers, at least one of the AAA server and the packet data network gateway is further operable to insert both the session charging identifier and the data flow charging identifier in an accounting request message that is sent to the offline charging system.

2. The communication network of claim 1 further comprising a Charging Data Function (CDF) in the offline charging system that is operable to:
process the accounting request messages for the session from the AAA server to generate a charging data record (CDR) for the session;
process the accounting request messages for the data flow from the packet data network gateway to generate a CDR for the data flow; and
wherein at least one of the CDRs includes both the session charging identifier and the data flow charging identifier.

3. The communication network of claim 2 further comprising a Charging Gateway Function (CGF) in the offline charging system that is operable to:
process the session charging identifier and the data flow charging identifier in the at least one of the CDRs to identify other CDRs having at least one of the session charging identifier and the data flow charging identifier;
correlate the CDRs based on the session charging identifier and the data flow charging identifier to generate a consolidated CDR; and
transmit the consolidated CDR to a billing domain.

4. The communication network of claim 3 wherein:
the AAA server is coupled to the CDF over an enhanced Diameter Rf interface; and
the packet data network gateway is coupled to the CDF over the enhanced Diameter Rf interface which carries at least one WLAN data flow attribute value pair (AVP).

5. The communication network of claim 4 wherein the accounting request messages include:
a first attribute value pair (AVP) assigned to the session charging identifier; and
a second AVP assigned to the data flow charging identifier.

6. The communication network of claim 5 wherein the accounting request messages further include:
a third AVP assigned to a start timestamp for the data flow; and
a fourth AVP assigned to a stop timestamp for the data flow.

7. The communication network of claim 1 wherein the packet data network gateway is implemented in the 3GPP network.

8. A 3rd Generation Partnership Project (3GPP) network operable to provide offline charging for sessions over a wireless local area network (WLAN) access network, the 3GPP network comprising:
an Authentication, Authorization, and Accounting (AAA) server operable to identify a session charging identifier assigned to a session over the WLAN access network; and
a packet data network gateway operable to identify a data flow charging identifier assigned to a bearer-level data flow occurring during the session over the WLAN access network;
the packet data network gateway further operable to transmit an update message to the AAA server indicating the data flow charging identifier assigned to the data flow, and/or the AAA server is further operable to transmit an update message to the packet data network gateway indicating the session charging identifier assigned to the session in order to share the session charging identifier or the data flow charging identifier between the AAA server and the packet data network gateway;
the AAA server further operable to generate accounting request messages for the session, and transmit the accounting request messages for the session to an offline charging system;
the packet data network gateway further operable to generate accounting request messages for the data flow, and transmit the accounting request messages for the data flow to the offline charging system;
wherein after sharing the charging identifiers, at least one of the AAA server and the packet data network gateway transmits an accounting request message to the offline charging system that includes both the session charging identifier and the data flow charging identifier.

9. The 3GPP network of claim 8 further comprising the offline charging system, wherein the offline charging system is operable to:
process the accounting request messages for the session from the AAA server to generate a charging data record (CDR) for the session; and
process the accounting request messages for the data flow from the packet data network gateway to generate a CDR for the data flow;
wherein at least one of the CDRs includes both the session charging identifier and the data flow charging identifier.

10. The 3GPP network of claim 9 wherein the offline charging system is further operable to:
process the session charging identifier and the data flow charging identifier in the at least one of the CDRs to identify other CDRs having at least one of the session charging identifier and the data flow charging identifier;
correlate the CDRs based on the session charging identifier and the data flow charging identifier to generate a consolidated CDR; and
transmit the consolidated CDR to a billing domain.

11. The 3GPP network of claim 8 wherein:
the AAA server is coupled to the offline charging system over an enhanced Diameter Rf interface; and the packet data network gateway is coupled to the offline charging system over the enhanced Diameter Rf interface which carries at least one WLAN data flow attribute value pair (AVP).

12. The 3GPP network of claim 11 wherein the accounting request messages include:
    a first attribute value pair (AVP) assigned to the session charging identifier; and
    a second AVP assigned to the data flow charging identifier.

13. The 3GPP network of claim 12 wherein the accounting request messages further include:
    a third AVP assigned to a start timestamp for the data flow; and
    a fourth AVP assigned to a stop timestamp for the data flow.

14. A method of providing offline charging in a 3rd Generation Partnership Project (3GPP) network for sessions over a wireless local area network (WLAN) access network, the method comprising:
    identifying, in an Authentication, Authorization, and Accounting (AAA) server, a session charging identifier that is assigned to a session over the WLAN access network;
    identifying, in a packet data network gateway, a data flow charging identifier assigned to a bearer-level data flow occurring during the session over the WLAN access network;
    transmitting an update message between the AAA server and the packet data network gateway indicating the session charging identifier or the data flow charging identifier in order to share the session charging identifier or the data flow charging identifier between the AAA server and the packet data network gateway;
    wherein after sharing the charging identifiers, the method further includes:
        generating, in the AAA server, accounting request messages for the session, and transmitting the accounting request messages for the session to an offline charging system; and
        generating, in the packet data network gateway, accounting request messages for the data flow, and transmitting the accounting request messages for the data flow to the offline charging system;
    wherein at least one of the accounting request messages includes both the session charging identifier and the data flow charging identifier.

15. The method of claim 14 further comprising:
    processing, in the offline charging system, the accounting request messages for the session from the AAA server to generate a charging data record (CDR) for the session; and
    processing the accounting request messages for the data flow from the packet data network gateway to generate a CDR for the data flow;
    wherein at least one of the CDRs includes both the session charging identifier and the data flow charging identifier.

16. The method of claim 15 further comprising:
    processing, in the offline charging system, the session charging identifier and the data flow charging identifier in the at least one of the CDRs to identify other CDRs having at least one of the session charging identifier and the data flow charging identifier;
    correlating the CDRs based on the session charging identifier and the data flow charging identifier to generate a consolidated CDR; and
    transmitting the consolidated CDR to a billing domain.

17. The method of claim 14 wherein:
    the AAA server is coupled to the offline charging system over an enhanced Diameter Rf interface; and
    the packet data network gateway is coupled to the offline charging system over the enhanced Diameter Rf interface which carries at least one WLAN data flow attribute value pair (AVP).

18. The method of claim 17 wherein the accounting request messages include:
    a first attribute value pair (AVP) assigned to the session charging identifier; and
    a second AVP assigned to the data flow charging identifier.

19. The method of claim 18 wherein the accounting request messages further include:
    a third AVP assigned to a start timestamp for the data flow; and
    a fourth AVP assigned to a stop timestamp for the data flow.

20. The method of claim 14 wherein the packet data network gateway is implemented in the 3GPP network.

* * * * *